United States Patent
Coughlin

[11] 3,721,264
[45] March 20, 1973

[54] COMBINATION SHUT-OFF CHECK AND PRESSURE SURGE RELIEF VALVE

[76] Inventor: Donald W. Coughlin, P.O. Box 2025, Lake Arrowhead, Calif.

[22] Filed: Oct. 20, 1971

[21] Appl. No.: 190,895

[52] U.S. Cl. ............................................. 137/596.2
[51] Int. Cl. ............................................. F16k 11/10
[58] Field of Search ................. 137/596, 596.1, 596.2

[56] References Cited

UNITED STATES PATENTS 3,592,226   7/1971   Graham, Jr. ................. 137/596.2 X Primary Examiner—Henry T. Klinksiek
Assistant Examiner—Robert J. Miller
Attorney—Dana E. Keech

[57] ABSTRACT

A threaded manually rotatable valve stem screws into the valve body with the valve head slideably mounted on the inner end of the stem and biased downwardly by a very light coil spring into engagement with the valve seat. When the stem is screwed to its innermost limit, it positively forces the valve head against the valve seat in "shut-off" position. When water under substantial (normal) pressure is delivered to the inflow chamber of the valve, its flow through the valve is prevented when the latter is thus shut off. When the stem is now reversely screwed manually to release the valve head from downward pressure by the stem, the incoming water pressure readily overcomes the light spring pressure biasing the valve head downwardly and lifts the valve head until further upper movement of the valve head is prevented by its coming into contact with the stem. This of course opens the valve to a flow of water through the same, with practically the same effect as if the valve head were directly mounted on the stem.

When a temporary failure of the supply of water to the valve occurs, the valve head is automatically lowered by its biasing spring into engagement with the valve seat, thus closing the valve against a reverse flow of liquid therethrough.

A pressure surge relief piston is slideable on said stem in a bore provided in the valve body (which bore connects with the out-flow chamber), this piston being biased downwardly by a heavy coil spring, with screw controlled tension, said tension being set to confine liquid under normal operating pressures but to yield to an abnormal pressure surge, thereby uncovering ports leading from said bore and relieving the out-flow chamber and the domestic water system connected therewith of said abnormal pressure surge.

3 Claims, 4 Drawing Figures

PATENTED MAR 20 1973  3,721,264

INVENTOR.
DONALD W. COUGHLIN
BY
ATTORNEY.

COMBINATION SHUT-OFF CHECK AND PRESSURE SURGE RELIEF VALVE

SUMMARY OF THE INVENTION

A manually operable shut-off valve is required to be installed at some point in the pipe leading from a water main for supplying a customer with domestic water service. It is also required by the plumbing code in some jurisdictions to provide said pipe with a check valve preventing a reverse flow of liquid through said pipe to the main such as might contaminate the water in the main.

It is an object of the present invention to provide a single valve which will perform both the function of shutting off the water service when the valve is manually closed and, that of automatically preventing a reverse flow of water to the main, notwithstanding the fact that the valve has been left in the manually open position required to permit water to flow along said pipe from said main to the customer.

Most domestic water customers are householders and one or more hot water heaters receive water through the piping system of the customer. Such heaters are subject to overheating resulting in the building up of surges of excessive steam pressure in the system which is denied outlet to the water main by the aforesaid check valve.

It is another object of the present invention to also embody in the same a pressure surge relief valve which will prevent any such pressure surge reaching an unsafe pressure level.

DETAILED DESCRIPTION OF THE PREFERRED EMBODIMENT

Figure 1:
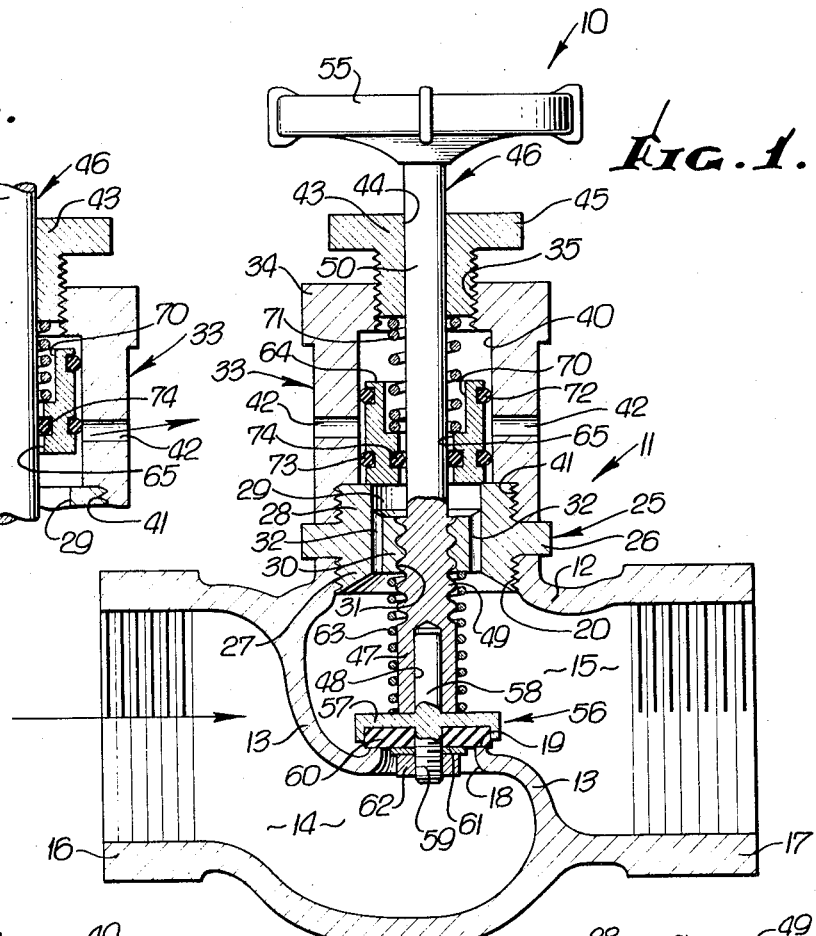
FIG. 1 is a vertical longitudinal sectional view of a preferred embodiment of the valve of the invention manually set in "shut-off" position, in which passage of water from the in-flow chamber to the out-flow chamber is positively prevented.

Referring specifically to the drawings, the valve 10 there disclosed includes a composite body assembly 11, the main element of which comprises a hollow casting 12 having an "S"-shaped inner wall 13 which divides the interior of the casting into in-flow and out-flow chambers 14 and 15, longitudinally aligned internally threaded pipe connection boxes 16 and 17, communicating respectively with the in-flow chamber 14 and out-flow chamber 15. A middle portion of wall 13 has a valve opening 18 providing communication between said in-flow and out-flow chambers, said opening being surrounded by an upwardly facing valve seat 19. Provided in the casting 12 concentric with said valve opening and seat and communicating with said out-flow chamber 15 is an internally threaded bore 20 by which the rest of the elements of the composite body assembly 11 are assembled with the casting 12.

The first of these elements comprises a short double ended threaded nipple 25 having an external radial hex-faced flange 26 by which the lower end 27 of said nipple can be screwed into the internally threaded bore 20 of the casting 12. Said lower end portion 27 of nipple 25 is internally beveled and the upper end 28 of said nipple is internally recessed at 29, said nipple having a central web 30 between the lower beveled end and recessed upper end of the nipple, said web having an internally threaded bore 31 formed axially therein and ducts 32 which communicate between recess 29 and out-flow chamber 15. Another element of the composite body assembly 11 is a piston housing 33 having a radial external hex-faced flange 34 at its upper end for applying a wrench thereto and has a short threaded axial bore 35, a piston chamber counterbore 40 and, at its lower end, a short internally threaded counterbore 41 which screws onto the threaded upper end portion 28 of nipple 25. At a predetermined level, the piston housing 33 is provided with pressure surge relief ports 42. Screwed downwardly into the short threaded bore 35 at the upper end of the piston housing 33 is a spring pressure adjusting plug 43 having an axial bore 44 and a hex-faced head 45.

A valve stem 46 includes a relatively large diameter lower portion 47 having a short axial bore 48 and external threads 49 which match the threads of and screw into the short axial threaded bore 31 of nipple 25. The upper portion 50 of stem 46 is cylindrical and has a diameter which slideably fits the bore 44 in plug 43. Fixed to the upper end of valve stem 46 is a hand wheel 55 for use in manually rotating the valve stem 46.

Trapped in the out-flow chamber 15 between the inner end of valve stem 46 and valve seat 19 is a valve head 56 including a shallow cup 57 which is integrally united with an axial guide pin 58 which extends upwardly from said cup and a threaded axial pin 59 which extends downwardly from the cup. The cup faces downwardly and contains therein a circular centrally apertured rubber packing disc 60 which fits over pin 59 and is secured in place within said cup by a washer 61 and a nut 62 applied to pin 59.

Coiled about the lower portion 47 of valve stem 46 is a light coiled expansive spring 63 which lightly biases the valve head 56 downwardly while said valve head is axially guided by the guide pin 58 being slideably received in the bore 48 formed in the lower end of valve stem 46.

Loosely slideable in the piston chamber 40 is a cylindrical piston 64, this piston also having an axial bore 65 which is loosely slideable on the smooth upper portion 50 of valve stem 46. The upper end of bore 65 has a counterbore 70 for receiving a relatively stiff coil spring 71 which is normally compressed between the lower end of counterbore 70 and the spring pressure adjusting plug 43. Mounted in suitable external and internal annular channels formed in the piston 64 are external O-rings 72 and 73 and an internal O-ring 74. The O-rings 72 and 73 form a tight seal between upper and lower end portions of the piston 64 and the piston chamber counterbore 40 of the housing 33. The O-ring 74 forms a tight seal between the bore 65 of said piston and the cylindrical upper portion 50 of the valve stem 46.

OPERATION

The valve 10 operates to perform three functions. The first of these is the function of a shut-off valve and the valve is shown in FIG. 1 as performing this function. Here we see that the stem 46 has been rotated by the hand wheel 55 so that the lower end of the stem engages the upper face of the valve head cup 57 and forces the packing disc 60 of the valve head into sealed relation with the valve seat 19. With the valve 10 thus closed, water or other fluid entering the in-flow chamber 14 is denied passage through the valve.

Figures 2, 3:
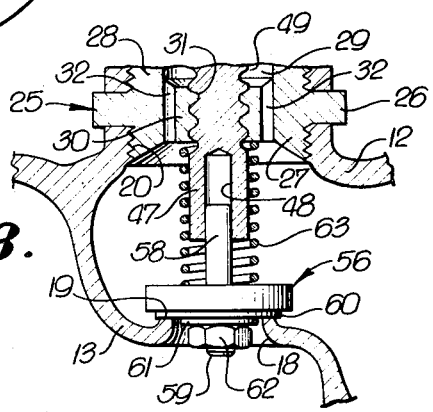
FIG. 2 is a fragmentary operational sectional view illustrating said valve manually set in "open" position with the valve head lifted from the valve seat by the pressure of water in the in-flow chamber exceeding that in the out-flow chamber.
FIG. 3 is a view similar to FIG. 2 illustrating said valve still set in "open" position but with the water pressure declining in the in-flow chamber below what it is in the out-flow chamber, thereby applying a downward liquid pressure on the valve head which, added to the normal light spring pressure applied downwardly to said valve head, closes the latter to effectively prevent a reverse flow of liquid through said valve.

The valve 10 is normally installed in a pipe line coming from a main for the purpose of supplying domestic service to a customer and this pipe is screwed into the pipe connection box 16 of the valve so as to connect directly with the in-flow chamber 14. When operating as a shut-off valve, the valve 10 therefore shuts off the flow of water from the main to the customer's domestic water supply system which connects with the pipe connection box 17 of the valve and receives water from the out-flow chamber 15 when the valve 10 is turned on as shown in FIG. 2. The valve 10 is turned on simply by unscrewing the stem 46 upwardly by manually rotating the hand wheel 55 which elevates the lower end of the valve stem so as to free the head 56 from downward pressure from the lower end of the stem. The light pressure of the spring 63 is insufficient to hold the head 56 in closed position as shown in FIG. 1, when the valve stem 46 is raised as shown in FIG. 2 and the pressure in the domestic system (and thus in the out-flow chamber 15) is less than the water pressure in the in-flow chamber 14 coming from the water main. As a predetermined substantial pressure of water is maintained in the water main under all normal conditions, the water pressure in the in-flow chamber 14 is normally always in excess of the water pressure in out-flow chamber 15 so that whenever the valve stem 46 is unscrewed as shown in FIG. 2 to open the valve, water pressure in the in-flow chamber 14 lifts the valve head 56 off the seat 19 as shown in FIG. 2 and this results in a flow of water in the direction of the arrow 75 through the valve opening 18.

The second function performed by the valve 10 is when this operates as a check valve, and its operation in this manner is disclosed in FIG. 3. Here we note that the valve stem 46 is still in elevated or open position but the valve head 46 is disposed downwardly in engagement with the valve seat 19. This action of the valve head 46 has resulted from an abnormal drop in the main line water pressure and in-flow chamber 14 whereby this pressure is less than the water pressure in the out-flow chamber 15 which as before noted is connected with the domestic water system of the customer. This presents the danger of contamination of the water in the main line unless a reverse flow of liquid through the valve 10 from the out-flow chamber 15 to the in-flow chamber 14 is not immediately halted. The closing of the valve automatically under these abnormal conditions is effected instantly in the valve 10 as soon as a reversal in relative pressures occurs as above described. FIG. 3 clearly illustrates how the valve head 56 reacts to this reversal of relative pressures by quickly yielding to the light pressure of the spring 63 and the excess of water pressure on the top of the valve head over that on the bottom thereof so as to lower the valve head immediately to valve closing position.

Such abnormal decreases in the main line water pressure occur without the knowledge of the customer and it is necessary that a check valve be placed in a connection between the water main and the domestic piping system of the customer to prevent a reverse flow of water from the customer's plumbing system to the main line. As shown above, the valve 10 performs this check valve function automatically and maintains this function just as long as conditions exists which might cause a reverse flow through the valve. As soon as the main line pressure is restored to normal, however, in the in-flow chamber 14, this pressure will be in excess of the pressure in chamber 15 and cause the valve head 56 to rise as shown in FIG. 2, thereby resuming delivery of a supply of water from the water main to the customer's domestic water system.

Figure 4:
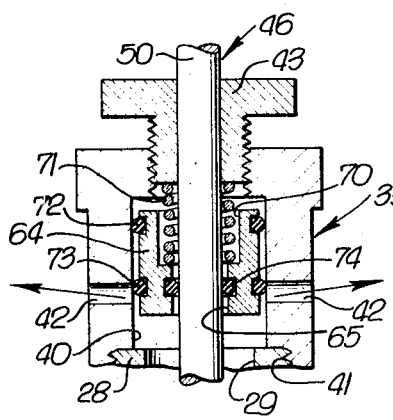
FIG. 4 is a fragmentary operational sectional view illustrating the pressure surge relief piston of the invention opening in response to a pressure surge to relieve the customer's water system before said surge exceeds the limits of safety.

The third function performed by the valve 10 of the invention has to do with the problem of relieving the customer's domestic water supply piping system from excessive pressure surges which generally are produced by malfunctioning of a water heater contained in that system. As the customer's water system is connected to the pipe connection box 17 of the valve 10 and thus communicates directly with the out-flow chamber 15 of the valve, such a pressure surge would produce a fluid pressure in the out-flow chamber 15 which is in excess of the normal operating pressures in the in-flow chamber 14 and would thus cause the valve head 56 to be forced downwardly as shown in FIG. 3 into valve closing position which would deny access of the steam or hot water in the out-flow chamber 15 from having access through the in-flow chamber 14 to the water main. The valve 10, under these circumstances, however, also offers a means to relieve the customer's domestic water supply system from the excessive pressures due to this pressure surge. This function is performed by the piston 64 responding to an excessive build up of pressure through the ducts 32 in the recess 29, the upper end of which is closed by the piston 64 thereby causing the piston to rise when this pressure is sufficient to covercome the downward biasing pressure of the spring 71 against the piston until the piston has risen to the point shown in FIG. 4 where the O-ring 73 is elevated above the level of the exhaust ports 42 thereby causing a discharge of fluid through these ports until the pressure surge is past and in any event preventing the pressures caused by said surge to rise above the danger limit.

Whatever that danger limit may be, the valve 10 is susceptible of adjustment by rotation of the plug 43 to vary the pressure applied downwardly by the biasing spring 71 against the piston 64, and thus fix the pressure level at which the piston valve will pop-off.

Thus, it will be seen that the valve 10 of the invention performs the function of a manual shut-off valve, which, of course, is not exercised excepting when it is necessary to shut off the customer's service from the main water line and on these infrequent occasions it is accomplished by manual rotation of the stem 46 of the valve to lower the stem as shown in FIG. 1 and this function is terminated whenever it is desired to restore the service of water from the main to the customer's system by rotating the stem 46 in a counterclockwise direction to elevate the lower end of this stem to the position in which it is shown in FIG. 2 thereby restoring the valve 10 to a condition where this permits free passage of water from the main to the customer's domestic water system.

The other two functions above described of the valve 10 are performed automatically while the stem of the valve is screwed upwardly into its normal operating position as shown in FIGS. 2 and 3. The valve 10 of the present invention is thus seen to perform the functions of three valves and yet embody these functions in a single valve, thereby introducing a great economy into the installation of service connections from the main water line to a domestic water customer.

I claim:

1. In a valve the combination of:
    a hollow valve body divided interiorly by a wall into in-flow and out-flow chambers, there being a valve seat surrounding an opening in said wall communicating between said chambers;
    internally threaded aperture means on said body concentric with said seat and communicating with said out-flow chamber;
    a manually rotatable threaded valve stem having a threaded portion which is screwed into said aperture means;
    a valve head between said stem and said seat and compressible by said stem against said seat to shut off said valve;
    means for guiding said valve head to maintain it in co-axial alignment with said stem and said seat, and permitting said head freedom to move toward and away from said seat when said stem is retracted from said valve closing portion;
    light spring means biasing said valve head towards said seat; said biasing action effectively closing said valve to prevent a reverse flow from said out-flow chamber to said in-flow chamber but being ineffective to retard flow from said in-flow chamber to said out-flow chamber of water delivered to said in-flow chamber under normal domestic pressures;
    said stem having a smooth cylindrical portion extending outwardly from said threaded stem portion,
    said body having a piston bore concentric with said cylindrical stem portion and disposed thereabout, there being duct means connecting the inner end of said bore with said out-flow chamber;
    a piston slideable on said smooth stem portion and within said bore;
    a relatively heavy coil spring biasing said piston downward against the bottom of said bore;
    a screw plug means making threaded engagement with said body to adjustably compress said spring against said piston; and
    there being surge escape port means in said body communicating with said bore above the lower end of said piston whereby a surge of fluid pressure building up in said out-flow chamber will be applied to the inner end of said piston until the pressure of said piston against said piston biasing spring will compress the latter and lift the piston until said escape port means is uncovered allowing escape of fluid therethrough until said pressure surge subsides.

2. A valve as recited in claim 1 wherein
    O-ring means seal the space between said piston and said bore, on the one hand, and between said piston and said smooth stem portion, on the other hand, to confine fluid behind said piston until the latter is shifted to uncover said escape ports.

3. In a valve, the combination of:
    a hollow valve body divided interiorly by a wall into in-flow and out-flow chambers, there being a valve seat surrounding an opening in said wall communicating between said chambers;
    internally threaded aperture means on said body concentric with said seat and communicating with said out-flow chamber;
    a manually rotatable threaded valve stem having a threaded portion which is screwed into said aperture means;
    a valve head between said stem and said seat, said stem being made effective by screwing it outwardly or inwardly to act on said valve head, on the one hand, to freely allow water, admitted under normal domestic water pressure to said in-flow chamber, to flow through said valve opening into said out-flow chamber or, on the other hand, to shut off such flow;
    said stem having a smooth cylindrical portion disposed outwardly from said threaded portion;
    said body having a bore concentric with said stem and surrounding said smooth portion;
    duct means connecting the inner end of said bore with said out-flow chamber; a surge relief piston slideable on said stem in said bore;
    means for adjustably biasing said piston against the inner end of said bore;
    means forming a sliding seal between said piston and said bore, on the one hand, and between said piston and said stem on the other hand; and
    surging fluid escape ports communicating with said bore above the inner end of said piston, whereby said surge pressure must greatly exceed normal domestic water pressure to lift said piston in said bore and thus effect the escape of fluid through said escape ports until said pressure surge subsides.

* * * * *